UNITED STATES PATENT OFFICE.

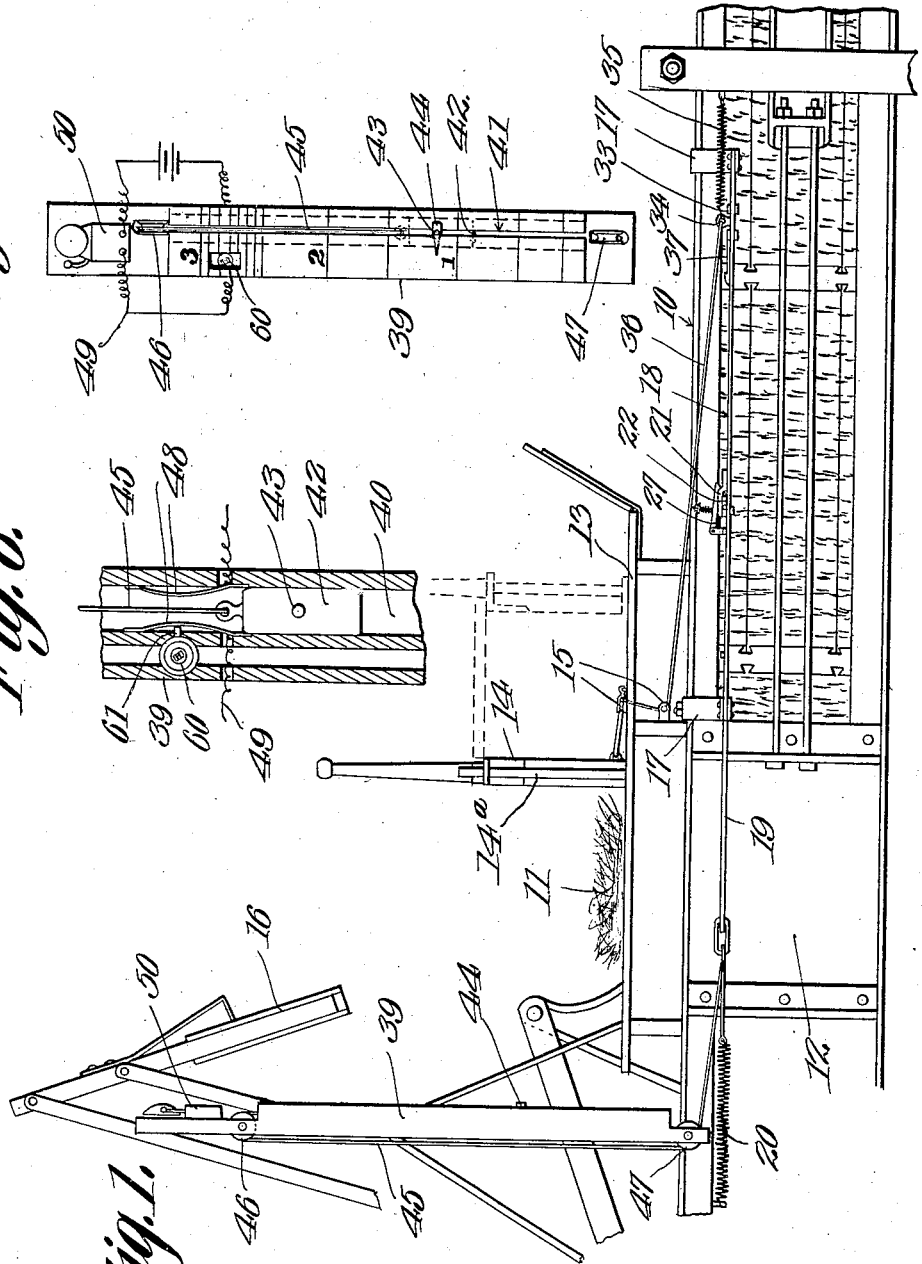

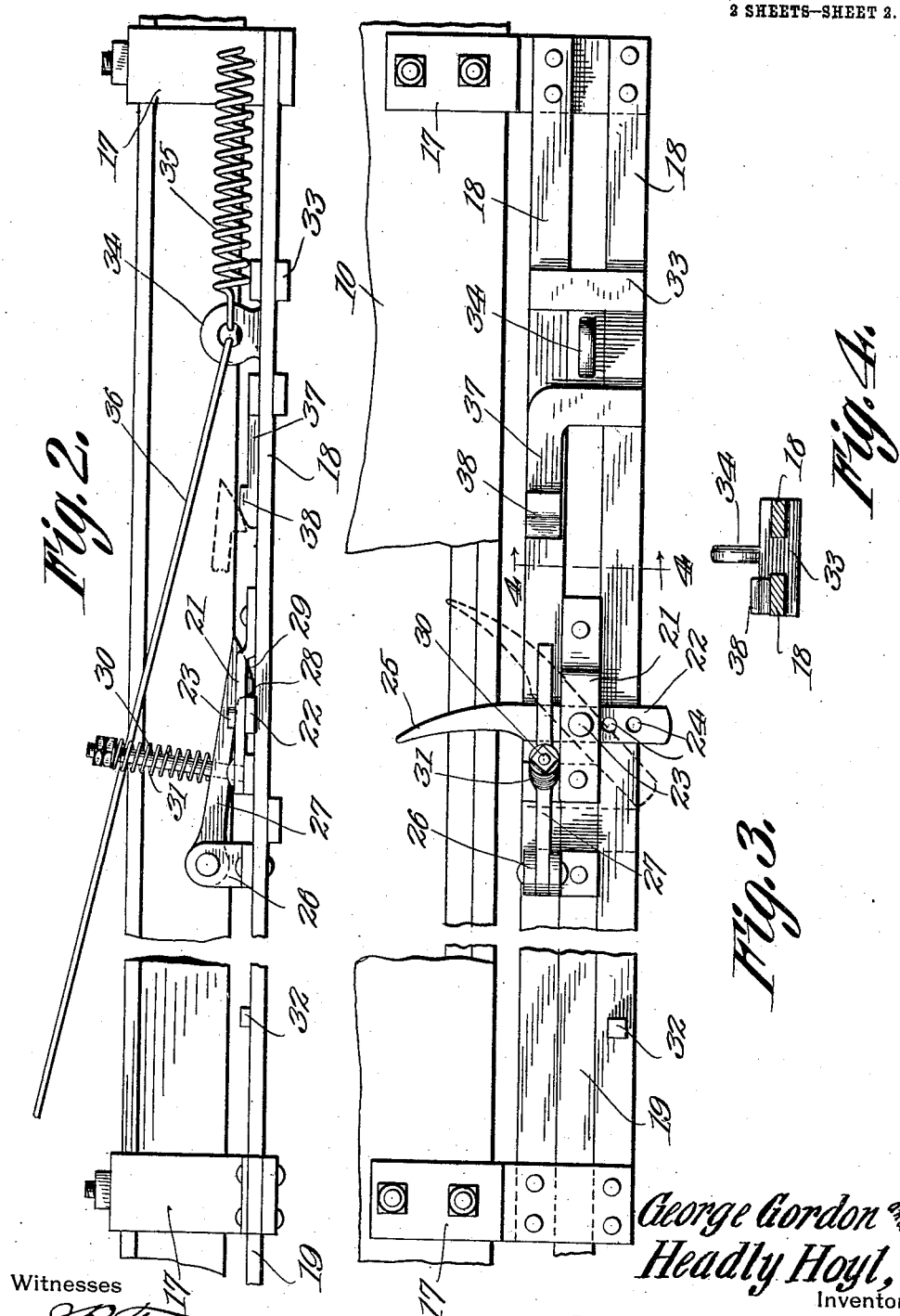

GEORGE GORDON AND HEADLY HOYL, OF MOUNTAIN VIEW, OKLAHOMA.

AUTOMATIC BALE-REGULATOR FOR HAY-BALERS.

1,069,124. Specification of Letters Patent. Patented Aug. 5, 1913.

Application filed October 19, 1912. Serial No. 726,837.

*To all whom it may concern:*

Be it known that we, GEORGE GORDON and HEADLY HOYL, citizens of the United States, residing at Mountain View, in the county of Kiowa, State of Oklahoma, have invented a new and useful Automatic Bale-Regulator for Hay-Balers, of which the following is a specification.

The present invention appertains to hay balers, and is particularly an automatic bale regulator for balers or baling presses.

It is the object of the present invention to provide an attachment for a hay baler that will be so constructed, and operated by the movement of the bales to permit the head block to be dropped at the proper time when the bale under completion has reached a predetermined length.

The present invention also comprehends a device of the character indicated which shall automatically return to initial position after the head block has been dropped, so as to again be brought into operation when the next bale is being formed.

The present invention also contemplates a mechanism of the character specified which shall include a visual indicator, which shall be so constructed and operated that the various stages of the bale being formed will be designated thereon.

A further object of the present invention is to provide an audible signal mechanism in connection with the foregoing, which shall be brought into operation slightly prior to the completion of the new bale in order that the feeder's attention may be directed to completing the bale so that the head block may be dropped into position.

With the above and other objects in view, which will be apparent as the invention is better understood, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a fragmental side elevation of a hay baler with the present invention applied thereto. Fig. 2 is an enlarged side elevation, partly broken away, of the main portion of the present invention, or that portion which is actuated by the motion of the bales to release the head block. Fig. 3 is a plan view of the parts illustrated in Fig. 2, parts being broken away and parts being removed. Fig. 4 is a section detail taken on the line 4—4 of Fig. 3. Fig. 5 is a front view of the indicator and signal, the electrical circuit for the signal being shown in the diagram. Fig. 6 is a sectional detail of the indicator.

Referring specifically to the drawings, the numeral 10 designates the frame or body of the baler which forms the bale chamber and the numeral 11 designates the mouth or hopper at the forward end of the bale chamber, through which the hay is delivered into the compressing chamber or box 12 at the forward end of the bale chamber, and into which the plunger (not shown) is forced to compress the hay therein and to feed the hay and bales rearwardly through the bale chamber. A platform 13 surrounds the mouth or hopper 11, and it is upon this platform that the feeder or attendant stands to feed or deliver the hay into the hopper 11. A suitable head block dropper 14 is pivoted to an upright 14ª mounted on the near side of the platform 13 to swing into the path of a dog or other part carried by the tamper or packer 16, which is provided for forcing the hay downwardly into the compressing chamber 12, so that when the head block hopper is swung into the path of the dog, the head block will be forced into the compressing chamber over the end of the bale. Thus, as illustrated in Fig. 1, the head block dropper 14 is pivoted at the near side of the hay baler, the head block dropper being shown in operative position in full line and being shown in inoperative position in dotted or broken line. This head block dropper is thus adapted to swing to the near side of the hay baler during the formation of the bale, and so that the head block may be inserted into the head block dropper, and when it is time to introduce the head block over the end of the newly completed bale, the head block dropper may be readily swung or moved to operative position, or transversely of the hay baler so that the dog or other member carried by the tamper or packer 16 will engage the head block and carry it into position within the compressing chamber.

The foregoing structure is common in hay balers, the details of which are of no moment as to the present invention, it being understood that the present attachment is applicable to various makes or styles of hay balers with equal propriety.

In carrying out the present invention, a pair of hangers or Z-bars 17 are secured to the frame 10 so as to depend at one side of the frame and a pair of spaced bars 18 are secured to the hangers 17 so as to form a guide or slideway for a follower 19, which is also constructed of a bar of suitable material. The forward end of the follower 19 is connected to a contractile spring 20, the said spring being connected to any suitable part of a baler so as to normally tend to move the follower forward or to initial position. The spring, however, permits the follower to move rearwardly.

The rear end of the follower 19 is guided between the bars 18 or within the slideway formed by said bars, a keeper 21 being secured on the rear end of the follower and a lever 22 being fulcrumed through the keeper 21 by means of a pin or pivot 23 engaging through the keeper, lever and follower. The lever 22 is preferably provided with a series of openings 24 through which the pin 23 is insertible, to adjust the length of the arms of the lever in order to accommodate the various balers, as will be understood. The inner arm of the lever 22 forms a dog or pawl 25 which is engageable with the bale within the bale chamber when the lever stands at right angles to the follower. The said lever provides the bale engaging means carried by the follower, so that when the lever is held in bale engaging position, the follower will be propelled or moved rearwardly with the bales, and so that when the lever is free, the same will swing out of engagement with the bales, as illustrated in dotted lines in Fig. 3, in which event, the spring 20 serves as means for returning the follower to initial position.

The lever 22 is held in bale engaging position by means of a latch 27 pivoted to the ears 26 carried by the follower directly in front of the lever 22, the latch having a shoulder 28 adjacent its free or rear end engageable over the inner arm of the lever and having its free end beveled as indicated by the numeral 29. Thus, when the latch 27 engages with the lever 22, the lever will be locked in bale engaging position and the follower will naturally be propelled rearwardly with the bales until the latch is released. This latch is yieldingly pressed into engagement with the lever by means of a stem 30, carried by the follower and working through the latch and a coiled wire spring 31 on the stem 30 bearing against the upper edge of the latch.

A stop 32 is secured to the outer bar 18 adjacent its forward end, and lies in the path of the outer arm of the lever 22, so that when the follower is returned to its initial position, the outer end of the lever will strike the stop 32 in order that the lever will be returned to bale engaging position. Thus, when the follower is returned to initial or normal position, the pawl 25 will be again swung into engagement with the proper bale, and the latch 27 will snap into engagement with the lever, so that the follower will again progress rearwardly. The stop 32 not only serves to swing the lever into bale engaging position, but also prevents the excessive forward movement of the follower when returned to initial position by the spring 20.

A suitable slide 33 is mounted in the rear end of the guide or between the rear ends of the bars 18, the said slide carrying an upstanding eye 34 to which the spring 35 is connected, the said spring being connected to any suitable part of the baler in order to give a proper tension to the slide. A cord or other flexible member 36 is also connected to the eye 34 and is connected to the head block dropper in any suitable manner over pulleys 15 so that when the head block dropper is swung to operative position the slide is slid forwardly. It will thus be clearly obvious that when the head block dropper is swung to inoperative position, such as illustrated in dotted lines in Fig. 1, the cord 36 will be slackened, and the spring 35 will pull the slide 33 rearwardly. It will also be apparent that when the head block dropper is swung into operative position, the cord 36 will be drawn taut so as to pull the slide forwardly against the tension of the spring 35.

The slide 33 has a forwardly extending projection 37 arranged over the inner bar 18, a lug or enlargement 38 being provided at the free or forward end of the projection, which lies in the path of the beveled free end 29 of the latch, and as the follower progresses rearwardly, the latch will approach the lug 38. When the latch has moved rearwardly sufficiently and when the head block dropper is swung into operative position, the slide will be drawn toward the latch, and the lug 38 will move under the beveled end 29 of the latch, as indicated in dotted lines in Fig. 2, so as to release the lever 22. In the event of the releasement of the lever 22, the pawl 25 will swing out of engagement with the bale, and the spring 20 will then be brought into play for returning the follower to normal or initial position, in which event the lever will be again swung into bale engaging position for a new operation. It will follow from the foregoing that when the follower has reached a predetermined position, that when the bale has been completed, the lever or bale engaging means may be released from the bale at the same time that the head block dropper is swung forwardly, or into operative position. Thus, when the bale has been completed, and the head block dropper is swung into operative position so that the tamper 16 in its downward stroke will carry the head block over the end of the bale, the cord 36 will be drawn forwardly with the head block dropper so as to move the slide 33 forwardly, and as a result, a lug 38 will wedge under the beveled end 29 of the latch, and will raise the latch so as to release the lever or the bale engaging means 22. The spring 20 will thus be brought into play, and the follower will be returned to initial or normal position, as will be understood.

It is necessary with balers of this character, that the feeder shall desist from feeding hay into the compressing chamber slightly prior to the time when the bale in formation is to be completed, and in this connection, it is desirable that a visual indicator and audible alarm or signal be provided in order to indicate the progress of the bale under formation and in order to indicate slightly prior to the completion of the bale, that the feeders should stop feeding hay into the compressing chamber, so that the plunger may be actuated a few times to complete the bale and force same rearwardly sufficiently to permit the head block to drop over the end of the newly completed bale. To these ends, there has been provided a suitable visual indicator and audible signal as will be directly described.

An upright 39 is secured to the forward end of the baler frame and has a longitudinal opening 40 extending therethrough and a longitudinal slot 41 complementing the opening. A weight 42 is slidable in the opening 40 and is provided with a finger or lug 43 projecting through the slot 41, a pointer 44 being carried by the finger and coöperating with a suitable scale of graduations provided on the face of upright 39. A cord or flexible member 45 is connected to the weight 42 and is trained over a pulley 46 journaled in the upper end of the upright and over a pulley 47 journaled in the lower end of the upright, the free end of the said cord being attached to the forward end of the follower 19. Thus, as the follower progresses rearwardly, the cord 45 will be drawn taut and the weight 42 will be raised, the pointer 44 indicating on the graduations, the stages of the bale under completion. It will be evident, that when the follower is returned to initial position, the weight 42 in gravitating will carry the cord 45 back therewith for a new operation of the indicator. It will also be evident at this point, that the present apparatus may be adjusted by shortening or lengthening the cords 36 and 45, to permit the bales to be made shorter or longer in length, within practical limits.

The audible signal includes a pair of spring contacts 48 secured to the opposite walls of the opening 40 adjacent its upper end which contacts lie in the path of the weight 42, the weight being of metal or other conductive material. To the spring contacts 48 are connected the respective terminals of an electrical circuit 49 including a bell or other audible signal 50, the bell being preferably secured to the upper end of the upright. Thus, when the weight 42 is raised, the same will pass between the contacts 48 and will close the circuit, in which event, the bell will ring to bring the feeder's attention to the fact that the bale under completion is almost ready for the head block. It is preferable to position the contacts 48 at such a point that the bell will ring when the bale under completion is about six inches short of its complete length, thus giving sufficient time for completing the bale in order that the head block may be properly dropped into position.

The operation of the device may be briefly summarized as follows: As the new bale is under formation it will be observed that the head block dropper is in inoperative position, the slide 33 being retracted or drawn rearwardly by the spring 35, and the lever 22 being in engagement with one bale so that the follower will be moved rearwardly with the bales, as the bale under formation is forced rearwardly from the compressing chamber. Now, when the bale is near completion this being indicated by the visual indicator, the audible signal will be sounded at a sufficient time prior to the completion of the bale, so that the feeder may stop feeding hay in the compressing chamber, so as to permit the tamper 16 to press all of the hay into the compressing chamber in order to properly form the end of the bale. Then after the hay within the compressing chamber has been packed and forced rearwardly by the plunger (not shown) the head block dropper is swung forwardly or into operative position, so that the next succeeding downward stroke of the tamper 16, will cause the head block to be forced over the end of the newly completed bale, and at the same time, the slide 33 will be moved forwardly so as to release the latch which in turn will relieve the lever 22 so that the spring 20 will return the follower to initial position. When the follower has been returned to initial position, it will be evident from the foregoing that the lever 22 will be again swung into bale engaging position, so that the follower will be again moved rearwardly, as the next succeeding bale is formed. By the provision of the visual indicator, the various stages of the bale under completion will be indicated thereby, so that the feeder may stop feeding hay into the compressing chamber at any appropriate time, and the head block dropper may then be swung into operative position so as to position the head block over the end of the newly formed bale. With the present device it is possible to regulate the lengths of the bales to a nicety, or to make the various bales of approximate equal lengths so that they will not vary appreciably in weight.

From the foregoing, the advantages and capabilities of the present apparatus will be manifest to those versed in the art, and it will be apparent that the objects aimed at have been carried out satisfactorily, the present device providing a desirable one for the purposes for which it is designed and being of a simple, durable, compact and inexpensive construction, as well as being efficient, convenient and serviceable in use. A tally register 60 is also preferably mounted in the upright and has an actuating plunger 61 standing behind one of the contacts 48, so that a record is kept of the number of bales made or delivered.

Having thus described the invention, what is claimed as new is:—

1. In combination with a baler, a yielding indicating mechanism engageable with the bales to be actuated thereby and to be brought under tension, and means for releasing the mechanism when the new bale is completed so that the mechanism will return to initial position.

2. In combination with a baler, an indicating mechanism, means connected thereto adapted to be brought under tension, the indicating mechanism embodying means engageable with the bales and adapted to be released when the new bale is completed so that the indicating mechanism may return to its initial position.

3. In combination with a baler, a mechanism having bale engaging means so that the said mechanism is actuated by the movement of the bales, an indicator coöperating with the said mechanism, yieldable means connected to the said mechanism and adapted to be brought under tension when the mechanism is actuated, the bale engaging means being releasable so that the said mechanism may return to its initial position.

4. In combination with a baler, a mechanism having bale engaging means so that the said mechanism is actuated by the movement of the bales, an indicator coöperating with the said mechanism, means for releasing the said bale engaging means, and means for returning the said mechanism to its initial position.

5. In combination with a baler, a mechanism having bale engaging means so that the said mechanism is actuated by the movement of the bales, an indicator coöperating with the said mechanism, means for bringing said mechanism under tension as it is actuated, and means for releasing the bale engaging means.

6. In combination with a baler, a follower, an indicator coöperating with the follower, bale engaging means carried by the follower, and means for releasing the bale engaging means to allow the follower to return to initial position.

7. In combination with a baler, a follower, an indicator coöperating with the follower, a bale engaging means carried by the follower, means for returning the follower into its initial position, and means for releasing the said bale engaging means when the follower has reached a predetermined position.

8. In combination with a baler, a follower, an indicator coöperating with the follower, a bale engaging dog carried by the follower, and means for releasing the dog from the bales at a predetermined position of the follower to allow the follower to return to initial position.

9. In combination with a baler, a follower, an indicator operated by the follower, a bale engaging dog carried by the follower, means for normally retaining the dog in bale engaging position, means for releasing the said means at a predetermined position of the follower, and means for returning the follower to initial position.

10. In combination with a baler, a follower, an indicator operated by the follower, a bale engaging dog carried by the follower, means carried by the follower for normally retaining the dog in bale engaging position, means for releasing the said means when the follower has reached a predetermined position, means for returning the follower to initial position, and means for swinging the dog into bale engaging position when the follower has returned to initial position.

11. In combination with a hay baler, a follower, an indicator operated by the follower, a bale engaging dog pivoted to the follower, a latch carried by the follower and normally engageable with the dog to retain same in bale engaging position, means for releasing the latch at a predetermined position of the follower, and means for returning the follower to initial position.

12. In combination with a hay baler, a follower, an indicator operated by the follower, a dog pivoted to the follower, a latch carried by the follower and normally engageable with the dog to retain the same in bale engaging position, means for releasing the latch at a predetermined position of the follower, means for returning the follower to initial position, and means for returning the dog to bale engaging position when the follower is returned to initial position.

13. In combination with a hay baler, a follower, an indicator actuated thereby, a lever fulcrumed to the follower, the inner arm of the lever forming a bale engaging dog, a spring pressed latch carried by the follower to normally engage the lever when the dog is in bale engaging position, a member arranged to move into the path of the latch so as to raise the latch and free the said lever, means for returning the follower to initial position, a stop lying in the path of the outer arm of the lever and designed to swing the dog into bale engaging position when the follower has returned to initial position, and means for moving the said member against the latch.

14. In combination with a hay baler, a guide, a follower slidable in the guide, an indicator actuated by the follower, a spring connected to the follower tending to return same to initial position, a lever fulcrumed to the follower and having its inner arm forming a bale engaging dog, a spring pressed latch carried by the follower to normally engage the lever when the dog is in bale engaging position, a stop secured to the guide to engage the outer arm of the lever for swinging the dog into bale engaging position when the follower is returned to initial position, a slide mounted in the guide having a member lying in the path of the latch to disengage the latch from the lever, and a flexible connection between the slide and the head block dropper whereby the slide is actuated when the head block dropper is moved to operative position so as to release the latch.

15. In combination with a hay baler, a mechanism actuated by the movement of the bales, means for returning same to initial position, and an indicator connected to and actuated by the said mechanism to indicate the stages of the bale under completion.

16. In combination with a hay baler, a yielding mechanism actuated by the movement of the bales, means for releasing the said mechanism so it will return to initial position and an audible signal mechanism connected to the aforesaid mechanism for operation prior to the completion of the new bale.

17. In combination with a hay baler, a mechanism actuated by the movement of the bales, means for returning same to initial position, an indicator connected to the said mechanism to indicate the stages of the bale under completion, and an audible signal mechanism operated by the indicator when the indicator reaches a predetermined position.

18. In combination with a hay baler, a mechanism having bale engaging means so that the said mechanism is actuated by the movement of the bales, means for releasing the bale engaging means, means for returning the said mechanism to initial position, and an indicator connected to the said mechanism to indicate the stages of the bale under formation.

19. In combination with a hay baler, a mechanism having bale engaging means so that the said mechanism is actuated by the movement of the bales, means for releasing the bale engaging means, means for returning the said mechanism to initial position, and an audible signal mechanism connected to the said mechanism for operation prior to the completion of the new bale.

20. In combination with a hay baler, a mechanism having bale engaging means so that the said mechanism is actuated by the movement of the bales, means for releasing the bale engaging means for returning the said mechanism to initial position, an indicator connected to the said mechanism to indicate the stages of the bale under formation, and an audible signal mechanism operated by the indicator when the indicator reaches a predetermined position.

In testimony that we claim the foregoing as our own, we have hereto affixed our signatures in the presence of two witnesses.

GEORGE GORDON.
HEADLY HOYL.

Witnesses:
GARLAND COCKRILL,
WESLEY S. FERGUSON.

---

Copies of this patent may be obtained for five cents each, by addressing the "Commissioner of Patents. Washington, D. C."